United States Patent
Chinzei et al.

(10) Patent No.: US 10,576,420 B2
(45) Date of Patent: *Mar. 3, 2020

(54) EXHAUST GAS PURIFYING CATALYST

(71) Applicants: Isao Chinzei, Toyota (JP); Hiromasa Suzuki, Toyota (JP); Takeru Yoshida, Miyoshi (JP); Masahide Miura, Toyota (JP); Yuki Aoki, Seto (JP); Mitsuyoshi Okada, Toyota (JP); Toshitaka Tanabe, Nagakute (JP); Akihiko Suda, Nagakute (JP); Yoshinori Saito, Kakegawa (JP); Hirotaka Ori, Kakegawa (JP); Kosuke Iizuka, Kakegawa (JP); Akira Morikawa, Nagakute (JP)

(72) Inventors: Isao Chinzei, Toyota (JP); Hiromasa Suzuki, Toyota (JP); Takeru Yoshida, Miyoshi (JP); Masahide Miura, Toyota (JP); Yuki Aoki, Seto (JP); Mitsuyoshi Okada, Toyota (JP); Toshitaka Tanabe, Nagakute (JP); Akihiko Suda, Nagakute (JP); Yoshinori Saito, Kakegawa (JP); Hirotaka Ori, Kakegawa (JP); Kosuke Iizuka, Kakegawa (JP); Akira Morikawa, Nagakute (JP)

(73) Assignees: TOYOTA JIDOSHA KABUSHIKI KAISHA, Toyota-shi, Aichi-ken (JP); CATALER CORPORATION, Kakegawa-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/534,794

(22) PCT Filed: Dec. 11, 2015

(86) PCT No.: PCT/JP2015/006201
§ 371 (c)(1),
(2) Date: Jun. 9, 2017

(87) PCT Pub. No.: WO2016/092860
PCT Pub. Date: Jun. 16, 2016

(65) Prior Publication Data
US 2018/0236401 A1    Aug. 23, 2018

(30) Foreign Application Priority Data
Dec. 12, 2014  (JP) ................... 2014-252022

(51) Int. Cl.
*B01D 53/94*  (2006.01)
*B01J 23/00*  (2006.01)
(Continued)

(52) U.S. Cl.
CPC .......... *B01D 53/945* (2013.01); *B01J 23/002* (2013.01); *B01J 23/10* (2013.01); *B01J 23/63* (2013.01);
(Continued)

(58) Field of Classification Search
CPC .... B01D 2255/1021; B01D 2255/1025; B01D 2255/2042; B01D 2255/2063;
(Continued)

(56) References Cited

U.S. PATENT DOCUMENTS 8,853,120 B2 * 10/2014 Aoki ................... B01D 53/945
                                                                    502/302
2010/0061903 A1    3/2010 Kohara et al.
(Continued)

FOREIGN PATENT DOCUMENTS

CN    102131582 A     7/2011
CN    103442804 A    12/2013
(Continued)

OTHER PUBLICATIONS

Office Action dated Nov. 5, 2018 from U.S. Patent & Trademark Office in U.S. Appl. No. 15/534,841.
(Continued)

Primary Examiner — Phutthiwat Wongwian
Assistant Examiner — Diem T Tran
(74) Attorney, Agent, or Firm — Sughrue Mion, PLLC

(57) ABSTRACT

The object of the present invention is to provide an exhaust gas purifying catalyst that can achieve high purification performance while suppressing $H_2S$ emissions. The object is solved by an exhaust gas purifying catalyst in which the lower layer of the catalyst coating layer comprises a ceria-zirconia composite oxide having a pyrochlore-type ordered array structure, in which the ceria-zirconia composite oxide contains at least one additional element selected from the group consisting of praseodymium, lanthanum, and yttrium at 0.5 to 5.0 mol % in relation to the total cation amount, and the molar ratio of (cerium+additional element):(zirconium) is within the range from 43:57 to 48:52.

5 Claims, 3 Drawing Sheets

(51) Int. Cl.

| | | |
|---|---|---|
| *F01N 3/10* | (2006.01) | |
| *C01G 25/02* | (2006.01) | |
| *B01J 23/10* | (2006.01) | |
| *B01J 23/63* | (2006.01) | |
| *B01J 35/00* | (2006.01) | |
| *B01J 35/10* | (2006.01) | |
| *B01J 37/00* | (2006.01) | |
| *B01J 37/02* | (2006.01) | |
| *B01J 37/03* | (2006.01) | |
| *C01F 17/00* | (2020.01) | |
| *B01J 37/08* | (2006.01) | |
| *B01J 35/02* | (2006.01) | |
| *B01J 27/053* | (2006.01) | |

(52) U.S. Cl.
CPC ......... *B01J 35/002* (2013.01); *B01J 35/0006* (2013.01); *B01J 35/1009* (2013.01); *B01J 37/009* (2013.01); *B01J 37/0244* (2013.01); *B01J 37/0248* (2013.01); *B01J 37/03* (2013.01); *C01F 17/0043* (2013.01); *C01G 25/02* (2013.01); *F01N 3/101* (2013.01); *B01D 2255/1021* (2013.01); *B01D 2255/1025* (2013.01); *B01D 2255/2042* (2013.01); *B01D 2255/2063* (2013.01); *B01D 2255/2066* (2013.01); *B01D 2255/2092* (2013.01); *B01D 2255/407* (2013.01); *B01D 2255/902* (2013.01); *B01D 2255/908* (2013.01); *B01J 27/053* (2013.01); *B01J 35/023* (2013.01); *B01J 37/08* (2013.01); *B01J 2523/00* (2013.01); *C01P 2002/36* (2013.01); *C01P 2002/50* (2013.01); *C01P 2002/74* (2013.01); *C01P 2004/61* (2013.01); *F01N 2510/06* (2013.01); *F01N 2570/24* (2013.01); *Y02T 10/22* (2013.01)

(58) Field of Classification Search
CPC .... B01D 2255/2066; B01D 2255/2092; B01D 2255/407; B01D 2255/902; B01J 2523/00; B01J 2523/48; B01J 2523/31; B01J 2523/3712; B01J 2523/3718; B01J 2523/25; B01J 2523/822; B01J 2523/828; B01J 23/002; B01J 23/10; B01J 23/63; B01J 27/053; B01J 35/0006; B01J 35/002; B01J 35/023; B01J 35/1009; B01J 37/009; B01J 37/0244; B01J 37/0248; B01J 37/03; B01J 37/08
USPC ................................................... 60/299, 301
See application file for complete search history.

(56) References Cited

U.S. PATENT DOCUMENTS

| | | |
|---|---|---|
| 2011/0020201 A1 | 1/2011 | Luo et al. |
| 2011/0113754 A1 | 5/2011 | Kohara et al. |
| 2012/0021899 A1 | 1/2012 | Nobukawa et al. |
| 2013/0029840 A1 | 1/2013 | Morikawa et al. |
| 2013/0310248 A1 | 11/2013 | Aoki et al. |
| 2014/0037524 A1 | 2/2014 | Mikita et al. |
| 2017/0348674 A1 | 12/2017 | Suzuki et al. |

FOREIGN PATENT DOCUMENTS

| | | |
|---|---|---|
| EP | 2 671 638 A1 | 12/2013 |
| JP | 2009-285604 A | 12/2009 |
| JP | 2010-201284 A | 9/2010 |
| JP | 2010-260046 A | 11/2010 |
| JP | 2012-24701 A | 2/2012 |
| WO | 2009/144568 A1 | 12/2009 |
| WO | 2010/001226 A1 | 1/2010 |
| WO | 2012/052828 A1 | 4/2012 |
| WO | 2012/101505 A1 | 8/2012 |
| WO | 2012/105454 A1 | 8/2012 |
| WO | 2014/199219 A1 | 12/2014 |
| WO | 2015/019156 A1 | 2/2015 |
| WO | 2015/049575 A1 | 4/2015 |

OTHER PUBLICATIONS

U.S. Appl. No. 15/534,841, Suzuki et al., filed Jun. 9, 2017, U.S. Pat. No. 2017/0348674.
Notice of Allowance dated Feb. 5, 2019 from the United States Patent and Trademark Office in U.S. Appl. No. 15/534,841.
Office Action dated Nov. 5, 2018 from U.S. Patent & Trademark Office in copending U.S. Appl. No. 15/534,841.
Notice of Allowance dated Sep. 16, 2019 from U.S. Appl. No. 15/534,841.
Corrected Notice of Allowability dated Oct. 11, 2019 from U.S. Appl. No. 15/534,841.

\* cited by examiner

EXHAUST GAS PURIFYING CATALYST

CROSS REFERENCE TO RELATED APPLICATIONS

This application is a National Stage of International Application No. PCT/JP2015/006201, filed on Dec. 11, 2015, which claims priority from Japanese Patent Application No. 2014-252022, filed on Dec. 12, 2014, the contents of all of which are incorporated herein by reference in their entirety.

TECHNICAL FIELD

The present invention relates to art exhaust gas purifying catalyst. More specifically, the present invention relates to an exhaust gas purifying catalyst having a catalyst coating layer composed of upper and lower layers, in which the lower layer contains a pyrochlore-type ceria-zirconia composite oxide comprising predetermined additional elements.

BACKGROUND ART

Exhaust gas discharged from internal combustion engines such as vehicle engines contains hazardous gases such as carbon monoxide (CO), nitrogen oxides (NOx), and unburned hydrocarbon (HC). An exhaust gas purifying catalyst (i.e., so-called three-way catalyst) capable of decomposing such hazardous gas contains, as a co-catalyst having oxygen storage capacity (OSC), a ceria-zirconia composite oxide or the like. A material having oxygen storage capacity (OSC material) has art effect of suppressing decrease in purification rate due to variation in the exhaust gas composition by absorbing/releasing oxygen and thereby controlling the air-fuel ratio (A/F) in a micro space.

In order to improve purification performance of an exhaust gas purifying catalyst, an OSC material is required to have a desirable oxygen absorption/release rate to respond to a sudden atmosphere change due to variation in A/F ratio and desirable oxygen storage capacity to maintain oxygen absorption/release capacity for a long period of time. In response to such requirements, for example, Patent Literature 1 suggests art exhaust gas purifying catalyst which exerts a high NOx purifying ability even after a duration test, which comprises a first oxygen storage material on which no noble metal is supported and which has a pyrochlore phase type ordered array structure; and a second oxygen storage material which has a higher oxygen storage rate and a lower oxygen storage capacity than the first oxygen storage material, wherein a platinum group noble metal is supported on the second oxygen storage material.

Meanwhile, for example, a catalyst having two catalyst layers (i.e., upper and lower layers) that separately contain Pt and Rh, respectively, has been suggested in view of problematic deterioration of catalyst activity due to solid solution formation of metals in a NOx storage-reduction exhaust purification catalyst that stores NOx in lean atmosphere in which oxygen excess, and releases the stored NOx by changing the exhaust gas atmosphere into stoichiometric or rich atmosphere in which reducible components excess, and purifies NOx by reacting it with reducible components such as HC and CO by the effect of noble metals for reduction (Patent Literature 2 and 3).

CITATION LIST

Patent Literature

PTL 1: JP Patent Publication (Kokai) No. 2012-024701 A
PTL 2: JP Patent Publication (Kokai) No. 2010-201284 A
PTL 3: JP Patent Publication (Kokai) No. 2009-285604 A

SUMMARY OF INVENTION

Technical Problem

A dual catalyst system combining a start-up catalyst (S/C, also referred to as a start-up converter) and an under-floor catalyst (UF/C, also referred to as an under-floor converter or underfloor catalyst) has been widely used in recent years. In such dual catalyst system, S/C is installed just below an internal combustion engine and thus exposed to exhaust gas at high temperatures. Meanwhile, since UF/C is provided downstream of S/C in which the concentration of incoming exhaust gas is small and the temperature thereof is relatively low, a conventional OSC material that requires high temperatures to exert its properties could not sufficiently exert an oxygen absorption/release function. In addition, if S/C becomes unable to sufficiently function due to deterioration or breakdown, UF/C is required to exert sufficient exhaust gas purification ability by itself. Especially in the case of UPC, oxygen absorption/release capacity and $NO_x$ purification performance are mutually-exclusive events and thus have been difficult to achieve with the use of conventional material.

Besides, there has been a problem that increase in the amount of conventional OSC material used for improving oxygen absorption/release capacity brings about adsorption of sulfur dioxide contained in an exhaust gas by ceria and the like and causes an increase in the amount of hydrogen sulfide ($H_2S$) generated upon reduction of sulfur dioxide. Since even a minute amount of $H_2S$ has a bad odor, it is preferable to suppress $H_2S$ emissions as much as possible. However, it has been difficult to achieve the both of high oxygen absorption/release capacity and suppression of $H_2S$ emissions with using conventional materials. The object of the present invention is to provide an exhaust gas purifying catalyst preferable to use as UF/C which has high purification performance while $H_2S$ emission is suppressed.

Solution to Problem

The present inventors have studied the above problem and found that an exhaust gas purifying catalyst that achieves high purification performance while suppressing $H_2S$ emission can be provided by using a newly developed pyrochlore-type ceria-Lirconia composite oxide comprising a predetermined additional element as an OSC material in the lower layer of a catalyst coating layer having upper and lower layers. The present invention is summarized as below.

(1) An exhaust gas purifying catalyst comprising a substrate and a catalyst coating layer formed on the substrate, wherein
the catalyst coating layer at least has an upper layer which contacts directly with an exhaust gas flowing into the catalyst, and a lower layer formed below the upper layer,
the upper layer comprises a carrier and a 1st noble metal catalyst supported by the carrier, wherein the 1st noble metal catalyst contains at least Rh,
the lower layer comprises a carrier, a 2nd noble metal catalyst supported by the carrier, and a ceria-zirconia composite oxide having a pyrochlore-type ordered array structure,
wherein the 2nd noble metal catalyst contains at least Pt or Pd,
wherein the ceria-zirconia composite oxide contains at least one additional element selected from the group consisting of praseodymium, lanthanum, and yttrium at 0.5 to 5.0 mol % in relation to the total cation amount, and the molar ratio of (cerium+additional element):(zirconium) is within the range from 43:57 to 48:52.

(2) The exhaust gas purifying catalyst according to (1), wherein the additional element contained in the ceria-zirconia composite oxide is praseodymium.

(3) The exhaust gas purifying catalyst according to (1) or (2), wherein the lower layer contains the ceria-zirconia composite oxide in an amount ranges from 1 to 20 g/L in relation to the substrate volume.

(4) The exhaust gas purifying catalyst according to any one of (3), wherein the catalyst coating layer has:

a portion in which the upper layer is not formed at the upstream side end of the exhaust gas purifying catalyst; and another portion in which the lower layer is not formed at the downstream side end of the exhaust gas purifying catalyst.

(5) The exhaust gas purifying catalyst according to (4), wherein the lower layer is formed over the area whose length is within the range from 75% to 85% of the total length of the substrate from the upstream side end of the exhaust gas purifying catalyst, and the upper layer is formed over the area whose length is within the range from 75% to 85% of the total length of the substrate from the downstream side end of the exhaust gas purifying catalyst.

Advantageous Effects of Invention

According to the exhaust gas purifying catalyst of the present invention, a pyrochlore-type ceria-zirconia composite oxide comprising a predetermined additional element is used for the lower layer of a catalyst coating layer having upper and lower layers. This enables the all of the improvement of oxygen absorption/release capacity, the improvement of NOx purification performance, and suppression of $H_2S$ emissions, which have been mutually-exclusive events, thereby making it possible to achieve high purification performance even at relatively low temperatures while suppressing $H_2S$ emissions.

This specification incorporates the content of the specification of Japanese Patent Application No. 2014-252022, for which priority is claimed to the present application.

DESCRIPTION OF EMBODIMENTS

Figure 1:
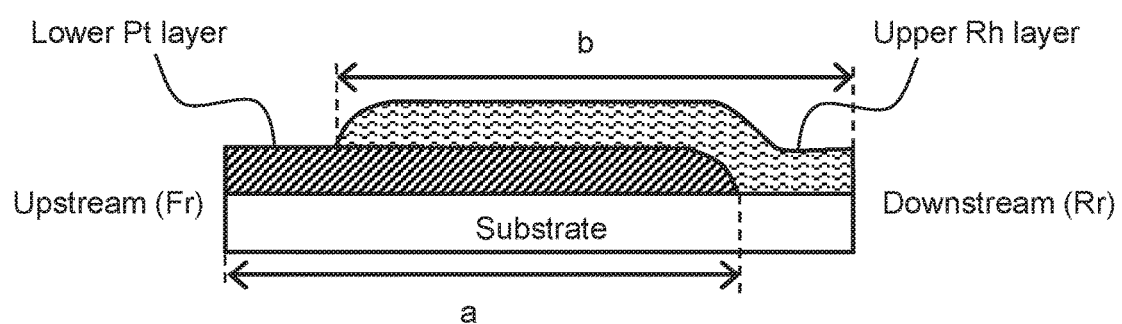
FIG. 1 schematically shows a cross-sectional view of a catalyst coating layer of the exhaust gas purifying catalyst of the present invention in one embodiment.

The exhaust gas purifying catalyst of the present invention comprises a substrate and a catalyst coating layer formed on the substrate, in which the catalyst coating layer at least has an upper layer which contacts directly with an exhaust gas flowing into the catalyst and a lower layer formed below the upper layer, and the lower layer comprises a ceria-zirconia composite oxide having a pyrochlore-type ordered array structure and containing at least one additional element selected from the group consisting of praseodymium (Pr), lanthanum (La), and yttrium (Y). The catalyst coating layer is composed of at least of two layers, i.e., an upper layer and a lower layer, however, it may be composed of three or more layers if needed. In such case, it is preferable for the "lower layer" in which a pyrochlore-type ceria-zirconia composite oxide comprising a predetermined additional element is contained to be formed directly below a top layer of the catalyst coating layer which contacts directly with an exhaust gas that flows into the catalyst.

(Ceria-Zirconia Composite Oxide Contained in the Lower Layer of the Catalyst Coating Layer)

The cerin-zirconia composite oxide contained in the lower layer (if the catalyst coating layer has three or more layers, it may be any layer below the top layer) of the catalyst coating layer of the exhaust gas purifying catalyst of the present invention is characterized in that it has a pyrochlore-type ordered array structure and contains at least one additional element selected from the group consisting of praseodymium, lanthanum, and yttrium at 0.5 to 5.0 mol %, more preferably 1.0 to 3.0 mol % in relation to the total cation amount and the molar ratio of (cerium+additional element):(zirconium) is within the range from 43:57 to 48:52.

The ceria-zirconia composite oxide is a novel OSC material developed by the present inventors. It is characterized in that heat-induced deterioration is suppressed and sufficient oxygen absorption/release capacity can be exerted at temperatures as low as about 400° C. it is further characterized in that the oxygen absorption/release capacity is large while the oxygen absorption/release rate is relatively slow, and both of specific surface area and bulk density are small. Regarding the specific surface area of the ceria-zirconia composite oxide, the BET specific surface area calculated from an adsorption isotherm using the BET isothermal adsorption formula is preferably within the range from 0.1 to 2 m$^2$/g, particularly from 0.2 to 1 m$^2$/g.

In general, the phrase that a ceria-zirconia composite oxide "has a pyrochlore-type ordered array structure" means that a crystal phase having a pyrochlore-type ordered array consisting of cerium ions and zirconium ions (pyrochlore phase) is formed. The array structure of the pyrochlore phase can be identified with the 2θ angle peaks at positions of 14.5°, 28°, 37°, 44.5°, and 51° in an X-ray diffraction pattern obtained with CuKα radiation. The term "peak" used herein refers to a peak having a height from the baseline to the peak top of 30 cps or more. In addition, when the diffraction line intensity is obtained, calculation is performed by subtracting the average diffraction line intensity of θ=10° to 12° as a background from the value of each diffraction line intensity.

In a ceria-zirconia composite oxide having a pyrochlore-type ordered array structure, the content ratio of a crystal phase having a pyrochlore-type ordered array structure, which is calculated from a peak intensity ratio of X-ray diffraction pattern, is preferably 50% or more and particularly 80% or more of the entire crystal phase. Methods for preparing ceria-zirconia composite oxide having a pyrochlore-type ordered array structure are known to those skilled in the art.

The pyrochlore phase of a ceria-zirconia composite oxide ($Ce_2Zr_2O_7$) has oxygen defect sites. When oxygen atoms enter the sites, the pyrochlore phase changes to a κ phase ($Ce_2Zr_2O_8$). Meanwhile, the κ phase can change to a pyrochlore phase by releasing the oxygen atoms. The oxygen storage capacity of a ceria-zirconia composite oxide is due to the mutual phase transition between the pyrochlore phase and the κ phase which causes absorption/release of oxygen.

In X-ray diffraction (XRD) measurement of a crystal phase of a ceria-zirconia composite oxide with CuKα radiation, a diffraction line of 2θ=14.5° is derived from a (111) plane of an ordered phase (κ phase), and a diffraction line of 2θ=29° is overlapping of a diffraction line derived from a (222) plane of an ordered phase and a diffraction line derived from a (111) plane of a ceria-zirconia solid solution having no pyrochlore phase. Therefore, I(14/29) value, that is the intensity ratio of both diffraction lines, can be used as an index demonstrating the abundance ratio of the ordered phase. In addition, since a diffraction line of 2θ=28.5° is derived from a (111) plane of $CeO_2$ itself, I(28/29) value, that is the intensity ratio of the diffraction line of 2θ=28.5° and that of 2θ=29°, can be used as an index demonstrating the degree of phase separation of $CeO_2$ from the composite oxide. Here, based on the PDF card of a κ phase (PDF2: 01-070-4048) and the PDF card of a pyrochlore phase (PDF2:01-075-2694), I(14/29) values of a complete κ phase and a complete pyrochlore phase can be calculated as 0.04 and 0.05, respectively.

The reason why a pyrochlore-type ceria-zirconia composite oxide in the present invention has the above properties by containing at least one additional element selected from the group consisting of praseodymium, lanthanum, and yttrium is assumed to be as follows. In the case of praseodymium, since ΔG (Gibbs free energy) of a reduction reaction expressed by the formula: $Pr_6O_{11} \rightarrow 3Pr_2O_3 + O_2$ is negative, a reduction reaction of $CeO_2$ expressed by the formula: $2CeO_2 \rightarrow Ce_2O_3 + 0.5O_2$ whose ΔG is positive is likely to occur. In the case of lanthanum and yttrium, since they are stable at trivalent state, they stabilize intracrystalline oxygen defects according to the principle of charge compensation.

Regarding durability, a pyrochlore-type ceria-zirconia composite oxide used in the present invention is characterized in that, when heated in the air at 1100° C. for 5 hours, I(14/29) and I(28/29) values obtained by X-ray diffraction measurement with CuKα radiation are 0.02 or more and 0.08 or less, respectively.

(The Lower Layer of the Catalyst Coating Layer)

The lower layer of the catalyst coating layer of the exhaust gas purifying catalyst of the present invention contains, as a 2nd noble metal catalyst, Pt or Pd. The 2nd noble metal catalyst may be Pt or Pd only, or a mixture of Pt and Pd only. Pt and Pd mainly contribute to purification by oxidation of CO and HC. The 2nd noble metal catalyst is supported on a carrier and contained in such form. The carrier is not particularly limited. Examples of the carrier include arbitrary metal oxides generally used as catalyst carriers such as alumina ($Al_2O_3$), ceria ($CeO_2$), zirconia ($ZrO_2$), silica ($SiO_2$), and titania ($TiO_2$), and any combination thereof. Alumina is preferably used as a carrier for a 2nd noble metal catalyst containing Pt or Pd in the lower layer of the catalyst coating layer. An alumina carrier may be a lanthana-added (lanthanum oxide-added) alumina carrier.

As described above, the lower layer of the catalyst coating layer comprises a ceria-zirconia composite oxide containing at least one additional element selected from the group consisting of praseodymium (Pr), lanthanum (La), and yttrium (Y) and having a pyrochlore-type ordered array structure. In order for the ceria-zirconia composite oxide to sufficiently exert its properties, the ceria-zirconia composite oxide is preferably present in the lower layer of the catalyst coating layer in an amount of 1 g/L or more, particularly 5 g/L or more, and more particularly 7.5 g/L or more in relation to substrate volume. Though conventional OSC materials could not sufficiently exert its properties because the temperature of the lower layer of the catalyst coating layer is below that of the upper layer of the catalyst coating layer, the ceria-zirconia composite oxide used in the present invention can exert oxygen absorption/release capacity even at relatively low temperatures and thus the function thereof would not significantly deteriorate even when it is used in the lower layer. In addition, the ceria-zirconia composite oxide has a small specific surface area and thus it is unlikely to adsorb sulfur oxide, indicating that an increase in the amount of the ceria-zirconia composite oxide used does not cause an increase in the amount of $H_2S$ emissions. In consideration of the balance between the effect of improving ability to purify NOx or the like and the amount of the ceria-zirconia composite oxide used, the ceria-zirconia composite oxide is preferably present in the lower layer of the catalyst coating layer in an amount of 20 g/L or less, particularly 15 g/L or less, and more particularly 12 g/L or less in relation to substrate volume. Typically, the ceria-zirconia composite oxide is present in the lower layer of the catalyst coating layer in an amount of preferably 1 to 20 g/L in relation to substrate volume.

The lower layer of the catalyst coating layer further comprises, as an OSC material, preferably a ceria-zirconia composite oxide, particularly preferably a ceria-zirconia composite oxide having a larger content of zirconia in relation to ceria (ZC). The expression "a larger content of zirconia in relation to ceria" used herein means that the proportion by weight of zirconia contained in a composite oxide is greater than that of ceria contained in the same. Regarding the abundance ratio, the weight ratio of ceria zirconia in the ZC material is preferably within the range from 1:1.1 to 1:5, particularly 1:1.5 to 1:3. The ZC material has oxygen absorption/release efficiency greater than that of a CZ material and thus the use of ZC material enables minimization of the amount of Ce to be used which may cause reduction in activity of noble metals such as Rh.

Further, the lower layer of the catalyst coating layer may contain a barium compound such as barium sulfate ($BaSO_4$). Barium sulfate can be used as an agent that controls viscosity of slurry for forming a catalyst coating. In addition, it is known that barium sulfate is thermally decomposed when exposed to heat so as to be supported in the form of Ba oxide in a surrounding constituent material, and the resulting Ba oxide functions to temporarily store NOx contained in an exhaust gas.

(The Upper Layer of the Catalyst Coating Layer)

In the exhaust gas purifying catalyst of the present invention, the upper layer of the catalyst coating layer contains, as a 1st noble metal catalyst, Rh, and it may further contain Pt or Pd. A 1st noble metal catalyst may be Rh only, a mixture of Rh and Pt only, a mixture of Rh and Pd only, or a mixture of Rh, Pt, and Pd only. Rh mainly contributes to reduction and purification of NOx. As in the case of the lower layer, a 1st noble metal catalyst is supported on a carrier. Examples of the carrier include, but are not particularly limited to, arbitrary metal oxides generally used as catalyst carriers, such as, alumina ($Al_2O_3$), zirconia ($ZrO_2$), silica ($SiO_2$), titania ($TiO_2$), and any combination thereof. A carrier for a 1st noble metal catalyst containing Rh in the upper layer of the catalyst coating layer is preferably a ceria-zirconia composite oxide, particularly a ceria-zirconia composite oxide having a larger content of zirconia in relation to ceria (ZC), capable of functioning as OSC material. In addition, the durability of the catalyst coating layer can be improved by mixing alumina having high thermostability into the catalyst coating layer, in addition to the carrier.

(Substrate and Catalyst Coating)

A substrate used for the exhaust gas purifying catalyst of the present invention is not particularly limited, and a generally used material with a honeycomb structure having many cells can be used for such a substrate. Examples of such material include: ceramics materials having thermostability such as cordierite ($2MgO.2Al_2O_3.5SiO_2$), alumina, zirconia, and silicon carbide; and metal material in the form of metal foil such as stainless steel. It is possible to form a catalyst coating layer on a substrate by a well-known method comprising, for example, pouring slurry prepared by suspending material(s) in distilled water and a binder into a substrate and blowing an unnecessary portion of sully off using a blower.

In the exhaust gas purifying catalyst of the present invention, as shown in FIG. 1 it is preferable that the catalyst coating layer have a portion in which the upper layer is not formed at one end of the exhaust gas purifying catalyst of the upstream side of the flow of exhaust gas (Fr side) and another portion in which the lower layer is not formed at the other end of the exhaust gas purifying catalyst of the downstream side of the flow of exhaust gas (Rr side). By providing a portion in which the upper layer is not formed on the upstream side of the flow of the exhaust gas, it is possible to facilitate oxidation and purification of HC and CO in the exhaust gas by the lower layer containing Pt and Pd, as 2nd noble metal catalysts. As a result of oxidation and purification of HC and CO on the upstream side, it is possible to prevent generation of a reduction atmosphere, which causes sulfur dioxide in the exhaust gas to become hydrogen sulfide ($H_2S$), thereby allowing suppression of $H_2S$ generation. In addition, by providing a portion in which the lower layer is not formed on the downstream side of the flow of the exhaust gas, it is possible to reduce the total amount of catalyst coating to reduce the sites of adsorption of $SO_2$ in the exhaust gas, thereby allowing further suppression of $H_2S$ generation. The lower layer is preferably formed such that the area thereof from the upstream side end of the exhaust gas purifying catalyst has a length accounting for 75% to 85%, particularly 78% to 82% of the full length of the substrate ("a" of FIG. 1), and the upper layer is preferably formed such that the area thereof from the downstream side end of the exhaust gas purifying catalyst has a length accounting for 75% to 85%, particularly 78% to 82% of the full length of the substrate ("b" of FIG. 1).

(Properties of the Exhaust Gas Purifying Catalyst of the Present Invention)

The exhaust gas purifying catalyst of the present invention is particularly suitable for use as UF/C in a dual catalyst system in which a start-up catalyst (S/C) and an under-floor catalyst (UF/C) are combined. In such dual catalyst system, S/C is installed just below an internal combustion engine and thus exposed to exhaust gas at high temperatures. Meanwhile, since UF/C is provided downstream of S/C in which the concentration of incoming exhaust gas is small and the temperature thereof is relatively low, a conventional OSC material (e.g., pyrochlore-type ZC material) could not sufficiently exert an oxygen absorption/release function. The exhaust gas purifying catalyst of the present invention has a catalyst coating layer in which a lower layer comprises a pyrochlore-type ceria-zirconia composite oxide containing a predetermined additional element, and thus it has ability to exert sufficient oxygen storage capacity even at low temperatures and thermostability. Therefore, exhaust gas purifying catalyst of the present invention is particularly preferable for use as UF/C.

EXAMPLES

The present invention is explained in more detail with reference to the Examples below. However, the present invention is not limited to the Examples.

1. Preparation of Pr-Added Pyrochlore ZC

First, the following were added to 1217 g of an aqueous solution containing ammonia in an amount 1.2 times the neutralization equivalent to obtain a coprecipitate: 442 g of a cerium nitrate aqueous solution (28% by mass calculated in terms of $CeO_2$), 590 g of a zirconium oxynitrate aqueous solution (18% by mass calculated in terms of $ZrO_2$), 100 g of an aqueous solution containing praseodymium nitrate in an amount corresponding to 1.2 g of $Pr_6O_{11}$, and 197 g of an aqueous solution containing hydrogen peroxide in an amount corresponding to 1.1 times the molar amount of cerium contained. The obtained coprecipitate was centrifuged and washed with ion-exchange water. The resulting coprecipitate was dried at 110° C., for 10 hours or more and sintered at 400° C. for 5 hours in the air. Thus, a solid solution containing cerium, zirconium, and praseodymium (a $CeO_2$—$ZrO_2$—$Pr_6O_{11}$ solid solution) was obtained. The obtained solid solution was pulverized by a pulverizer (product name: Wonder-Blender; AS ONE Corporation) such that they have a particle size equal or less than 75 μm after sieving to obtain a ceria-zirconia-praseodymium solid solution powder.

Next, 2 g of the obtained solid solution powder was packed into a polyethylene bag (volume: 0.05 L), the bag was deaerated, and the opening of the bag was heat-sealed. Subsequently, the bag was subjected to cold isostatic pressing (CIP) at a pressure (molding pressure) of 2000 kgf/cm² for 1 minute for molding using a cold isostatic pressing machine (product name: CK4-22-60, Nikkiso Co., Ltd.) to obtain a molded product of the ceria-zirconia-praseodymium solid solution powder. The size and weight of the molded product were as follows: length: 4 cm; width: 4 cm; average thickness: 7 mm; and weight: approximately 20 g.

Next, the obtained molded product (2 sheets) was placed in a crucible filled with 70 g of activated carbon (inner volume: 8 cm in diameter and 7 cm in height). The crucible was closed with a cover and placed in a high-speed heating electric furnace, followed by heating to 1000° C. for a heating-up period of 1 hour and heating to 1700° C. (reduction treatment temperature) for a heating-up period of 4 hours. The temperature was maintained for 5 hours. Then, the temperature was cooled to 1000° C. for a cooling period of 4 hours and then cooled to room temperature by natural heat radiation. The obtained reduction treatment product was heated at 500° C. for 5 hours in the air for oxidation to obtain a praseodymium-added pyrochlore-type ceria-zirconia composite oxide (Pr-added pyrochlore ZC) with a content ratio (molar ratio) of cerium:zirconium:praseodymium of 45:54:1. The obtained Pr-added pyrochlore ZC was pulverized to a particle size of 75 μm or less by sieving.

The obtained Pr-added pyrochlore; ZC was heated at 1100° C. for 5 hours in the air (high temperature durability test). Then, in order to confirm whether or not the pyrochlore structure had been maintained, the crystal phase of the treated Pr-added pyrochlore ZC was assayed by X-ray diffraction. An X-ray diffraction apparatus (product name: RINT-2100; Rigaku Corporation) was used to measure X-ray diffraction patterns under the following conditions to obtain I(14/29) and I(28/29) values: CuKα radiation: 40 KV; 30 mA; 2θ=27 minute.

Samples A to E of Pr-added pyrochlore ZC having different molar ratios of cerium:zirconium:praseodymium were prepared and subjected to high temperature durability tests, and then X-ray diffraction patterns were measured to obtain I(14/29) and I(28/29) values in the manner described above. Table 1 summarizes the results.

TABLE 1

| Pr-added pyrochlore ZC | Cation molar ratio | | | I (14/29) value | I (28/29) value |
|---|---|---|---|---|---|
| | Ce | Zr | Pr | | |
| A | 45 | 54 | 1 | 0.033 | 0.008 |
| B | 43.5 | 54 | 2.5 | 0.037 | 0.007 |
| C | 40.5 | 57 | 2.5 | 0.031 | 0.006 |
| D | 45.5 | 52 | 2.5 | 0.032 | 0.008 |
| E | 41 | 54 | 5 | 0.032 | 0.008 |

2. Preparation of Catalysts (1) Comparative Example 1: Double-Layered Catalyst Free of Pr-Added Pyrochlore ZC (a) Lower Pt layer (Pt (0.2)/$Al_2O_3$ (25)+ZC (30)+$BaSO_4$ (2.5))

Pt material supported by $Al_2O_3$ (material 1) was prepared using an $Al_2O_3$ carrier containing $La_2O_3$ (1% by mass) and platinum nitrate by an impregnation method. Next, material 1, a ceria-zirconia composite oxide with a molar ratio of cerium:zirconium of 46:54 (ZC), barium sulfate ($BaSO_4$), and an $Al_2O_3$ binder were added into distilled water with stirring and suspending to obtain slurry 1.

Slurry 1 was poured into a honeycomb-structured cordierite substrate for coating the substrate wall surface and then an unnecessary portion of slurry 1 was blown off using a blower. Coating was initiated front the upstream side of the flow of exhaust gas (Fr side) so that a coating was formed over the area whose length from the upstream side end is within 80% of the full length of the substrate (see FIG. 1, a=80%). The coating was controlled such that the contents of material 1, ZC, and $BaSO_4$ in the coating become 25 g/L (Pt: 0.2 g/L), 30 g/L, and 2.5 g/L, respectively, relative to the volume of the substrate. After coating, moisture was removed using a dryer at 120° C. for 2 hours, and the resultant was subjected to sintering at 500° C. in an electric furnace for 2 hours.

(b) Upper Rh layer (Rh (0.12)/$ZrO_2$ (40)+$Al_2O_3$ (20))

Rh/ZC material supported by ZC (material 2) was prepared using a ceria-zirconia composite oxide carrier with a molar ratio of cerium:zirconium of 46:54 (ZC) and rhodium nitrate by an impregnation method. Next, material 2, $Al_1O_3$, and an $Al_2O_3$ binder were added into distilled water with stirring and suspending to obtain slurry 2.

Slurry 2 was poured into a honeycomb-structured substrate, in which a coating is formed according to (a) above and then an unnecessary portion of slurry 2 was blown off using a blower. Coating was initiated from the downstream side of the flow of exhaust gas (Rr side) so that a coating was formed over the area within 80% of the full length of the substrate from the downstream side end (see FIG. 1, b=80%). The coating was controlled such that the contents of material 2 and $Al_2O_3$ in the coating become 40 g/L (Rh: 0.12 g/L) and 20 g/L, respectively, relative to the volume of the substrate. After coating, moisture was removed using a dryer at 120° C. for 2 hours, and the resultant was subjected, to sintering at 500° C. in an electric furnace for 2 hours.

(2) Examples 1 to 3

A catalyst was prepared in the manner described in Comparative Example 1 except that Pr-added pyrochlore ZC with a molar ratio of cerium zirconium:praseodymium of 45:54:1 (A in table 1) was further added when preparing slurry 1. The contents of Pr-added pyrochlore ZC in the coating were adjusted to 5 g/L, 10 g/L, and 20 g/L in Examples 1, 2, and 3, respectively, in relation to the volume of the substrate.

(3) Comparative Examples 2 and 3

A catalyst was prepared in the manner described in Comparative Example 1 except that a ceria-zirconia composite oxide having a molar ratio of cerium:zirconium of 46:54 (ZC) was added when preparing slurry 1. The contents of ZC in a coating were adjusted to 10 g/L and 30 g/L in Comparative Examples 2 and 3, respectively, in relation to the volume of the substrate.

(4) Comparative Example 4

A conventional pyrochlore-type ceria-zirconia composite oxide free of Pr (containing cerium and zirconium with a molar ratio of cerium:zirconium of 46:54) (conventional pyrochlore ZC) was prepared in the manner described in (1) above except that praseodymium nitrate was not used. A catalyst was prepared in the manner described in Comparative Example 1 except that conventional pyrochlore ZC was added when preparing slurry 1. The content of conventional pyrochlore ZC in a coating was adjusted to 10 g/L in relation to the volume of the substrate.

Table 2 lists the compositions of the lower and upper layers of the catalysts in Examples 1 to 3 and Comparative Examples 1 to 4.

TABLE 2

| | Lower layer: Pt(0.2)/$Al_2O_3$(25) + ZC(30) + $BaSO_4$ | Upper layer: Rh(0.12)/$ZrO_2$(40) + $Al_2O_3$(20) |
|---|---|---|
| Example 1 | +Pr-added pyrochlore ZC (5) | — |
| Example 2 | +Pr-added pyrochlore ZC (10) | |
| Example 3 | +Pr-added pyrochlore ZC (20) | |
| Comparative Ex. 1 | — | — |
| Comparative Ex. 2 | +ZC (10) | |
| Comparative Ex. 3 | +ZC (30) | |
| Comparative Ex. 4 | +Conventional pyrochlore ZC (4) | |

3. Evaluation (1) Durability Test

Each catalyst was attached to an exhaust system of a V-type 8-cylinder gasoline engine (4.3 L) and subjected to a 50-hour durability test at a catalyst bed temperature of 950° C. by conditions including switching feedback, fuel-cut, rich, and lean within one minute.

(2) Evaluation of the NOx Purification Rate Upon with Variable A/F Ratio

Each catalyst subjected to the durability test was installed, as a UF/C, in an actual engine provided with deteriorated S/C (Pd/Rh catalyst). The inlet gas temperature was set to 400° C. The amount of NOx emissions when A/F of the inlet gas atmosphere was caused to periodically swing between rich and lean regions (14.0-15.0) was measured.

(3) Evaluation of the Amount of $H_2S$ Emissions During Acceleration

Each catalyst was installed in an engine to which a fuel with a high sulfur content had been supplied such that the catalyst adsorbed sulfur. Next, the amount of hydrogen sulfide emissions during acceleration of the engine was measured. Evaluation was based on the rate with respect to the level in Comparative Example 1 in which Pr-added pyrochlore ZC, conventional ZC, or conventional pyrochlore ZC had not been added.

4. Results

Figure 2:
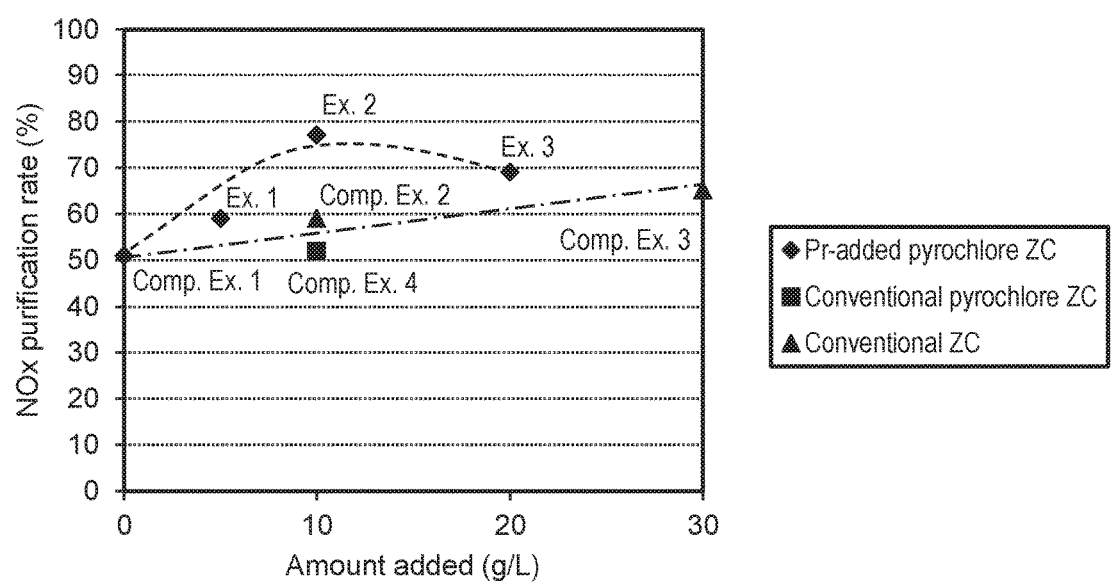
FIG. 2 is a graph showing the relationship between the amounts of Pr-added pyrochlore ZC, conventional ZC or conventional pyrochiore ZC added to the lower layer and the NOx purification rate.

FIG. 2 is a graph showing the relationship between the amounts of Pr-added pyrochlore ZC, conventional ZC, or conventional pyrochlore ZC added to the lower layer and the NOx purification rate. It was found that even a small amount of Pr-added pyrochlore ZC added was effective, and thus the effect of increasing the NOx purification rate by 1.5 times at a maximum was obtained. Meanwhile, when conventional ZC was used, as the amount added increased, the NOx purification rate increased. However, it was found that comparable effects could not be obtained without significantly increasing the amount added, compared with the amount of Pr-added pyrochlore ZC added. In addition, when the conventional pyrochlore-type ceria-zirconia composite oxide free of additional elements such as Pr (conventional pyrochlore ZC) was used, the obtained effect was much lower than that obtained with the use of conventional ZC.

Figure 3:
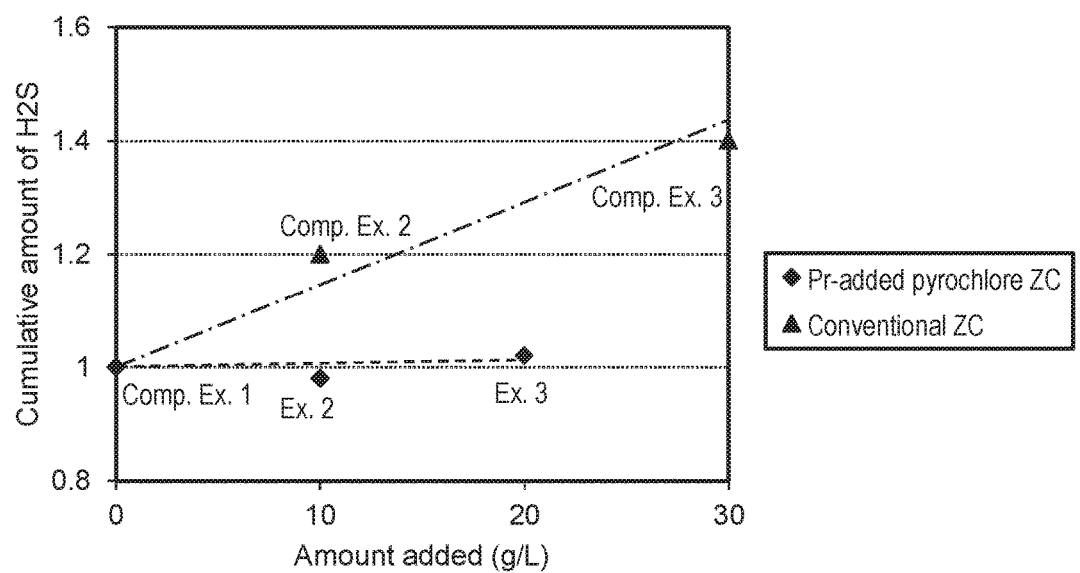
FIG. 3 is a graph showing the relationship between the amount of Pr-added pyrochlore ZC or conventional ZC added and the NOx purification rate with variable A/F ratio.

FIG. 3 is a graph showing the relationship between the amount of Pr-added pyrochlore ZC or conventional ZC added and the NOx purification rate with variable A/F ratio. When conventional ZC was used, the amount of $H_2S$ emissions increased in proportion to an increase in the amount of conventional ZC added. On the other hand, when Pr-added pyrochlore ZC was used, the amount of $H_2S$ emissions did not substantially increase.

All references, including any publications, patents or patent applications cited in this specification are hereby incorporated by reference in their entirely.

The invention claimed is:

1. An exhaust gas purifying catalyst comprising a substrate and a catalyst coating layer formed on the substrate, wherein
    the catalyst coating layer at least has an upper layer which contacts directly with an exhaust gas flowing into the catalyst, and a lower layer,
    the upper layer comprises a carrier and a first noble metal catalyst supported by the carrier, wherein the first noble metal catalyst contains at least Rh,
    the lower layer comprises a carrier, a second noble metal catalyst supported by the carrier, and a ceria-zirconia composite oxide having a pyrochlore ordered array structure, wherein the second noble metal catalyst contains at least Pt or Pd,
    wherein the ceria-zirconia composite oxide contains at least one additional element selected from the group consisting of praseodymium, lanthanum, and yttrium at 0.5 to 5.0 mol % in relation to the total cation amount, and the molar ratio of (cerium+additional element): (zirconium) is within the range from 43:57 to 48:52; and
    wherein the catalyst coating layer has:
    a portion in which the upper layer is not formed at the upstream side end of the exhaust gas purifying catalyst;
    a portion in which the lower layer is formed below the upper layer; and
    a portion in which the lower layer is not formed at the downstream side end of the exhaust gas purifying catalyst.

2. The exhaust gas purifying catalyst according to claim 1, wherein the additional element contained in the ceria-zirconia composite oxide is praseodymium.

3. The exhaust gas purifying catalyst according to claim 1, wherein the lower layer contains the ceria-zirconia composite oxide in an amount ranges from 1 to 20 g/L in relation to the substrate volume.

4. The exhaust gas purifying catalyst according to claim 2, wherein the lower layer contains the ceria-zirconia composite oxide in an amount ranges from 1 to 20 g/L in relation to the substrate volume.

5. The exhaust gas purifying catalyst according to claim 1, wherein
    the lower layer is formed over the area whose length is within the range from 75% to 85% of the total length of the substrate from the upstream side end of the exhaust gas purifying catalyst, and
    the upper layer is formed over the area whose length is within the range from 75% to 85% of the total length of the substrate from the downstream side end of the exhaust gas purifying catalyst.

* * * * *